United States Patent
Qian et al.

(10) Patent No.: US 11,663,914 B2
(45) Date of Patent: May 30, 2023

(54) GEOHASH-BASED TRAFFIC MANAGEMENT

(71) Applicant: INTERNATIONAL BUSINESS MACHINES CORPORATION, Armonk, NY (US)

(72) Inventors: Jun Qian, Beijing (CN); Cheng Luo, Beijing (CN); Lan Cao, Beijing (CN); Shiwen He, Shanghai (CN); Ke Zhang, Beijing (CN); Yuan Yuan Jia, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 16/948,944

(22) Filed: Oct. 7, 2020

(65) Prior Publication Data
US 2022/0108609 A1 Apr. 7, 2022

(51) Int. Cl.
*G08G 1/0968* (2006.01)
*G08G 1/123* (2006.01)
(Continued)

(52) U.S. Cl.
CPC ........... *G08G 1/0968* (2013.01); *B60W 60/00* (2020.02); *G08G 1/0112* (2013.01);
(Continued)

(58) Field of Classification Search
CPC .. G08G 1/0968; G08G 1/0112; G08G 1/0125; G08G 1/123; H04W 4/029; H04W 4/021; B60W 60/00
See application file for complete search history.

(56) References Cited

U.S. PATENT DOCUMENTS

| 8,825,349 B2 | 9/2014 | Sumizawa |
| 9,659,496 B2 | 5/2017 | Massey |

(Continued)

FOREIGN PATENT DOCUMENTS

| CN | 103544850 B | 1/2014 | |
| CN | 103870890 B | 6/2014 | |
| CN | 111339230 A | * 6/2020 | ........... G01C 21/367 |

OTHER PUBLICATIONS

Johari, et al., "Ubiquitous RFID Network for Highway Monitoring and Management", ResearchGate, Proceedings of the Int. Conf. on Computer and Communication Engineering, May 2006, 5 pages. vol. II, ISBN 983-43090-1-5, Retrieved form the Internet: <URL: https://www.researchgate.net/publication/266290446_Ubiquitous_RFID_Network_for_Highway_Monitoring_and_Management>.
(Continued)

*Primary Examiner* — Aniss Chad
*Assistant Examiner* — Stephanie T Su
(74) *Attorney, Agent, or Firm* — Samuel A. Waldbaum (57) ABSTRACT

Methods, apparatus, computer program products Geohash-based traffic management are provided. The method comprises receiving, by one or more processing units, respective operating status data of one or more vehicles travelling within a Geohash cell; generating, by one or more processing units, one or more service messages based on the received respective operating status data according to one or more service specifications; and providing, by one or more processing units, at least one of the one or more service messages responsive to a request from a vehicle travelling within the Geohash cell.

14 Claims, 6 Drawing Sheets

(51) Int. Cl.
*G08G 1/01* (2006.01)
*H04W 4/029* (2018.01)
*H04W 4/021* (2018.01)
*B60W 60/00* (2020.01)

(52) U.S. Cl.
CPC ........... *G08G 1/0125* (2013.01); *G08G 1/123* (2013.01); *H04W 4/021* (2013.01); *H04W 4/029* (2018.02)

(56) References Cited

U.S. PATENT DOCUMENTS

| | | |
|---|---|---|
| 10,115,311 B2 | 10/2018 | Oh |
| 2013/0282357 A1 | 10/2013 | Rubin |
| 2015/0379114 A1* | 12/2015 | Onishi ................. H04L 65/403 707/737 |
| 2017/0344941 A1* | 11/2017 | Thakur ............. G06Q 10/0834 |
| 2018/0062976 A1 | 3/2018 | Chia |
| 2019/0102387 A1* | 4/2019 | Kumar ............. G06F 16/24554 |
| 2019/0141495 A1* | 5/2019 | Jha ........................ H04L 45/306 |
| 2022/0042819 A1* | 2/2022 | Bonnet ............ G08G 1/096716 |

OTHER PUBLICATIONS

Mell et al., "The NIST Definition of Cloud Computing", National Institute of Standards and Technology, Special Publication 800-145, Sep. 2011, 7 pages.

Santa, et al., "Deployment of vehicular networks in highways using 802.11p and IPv6 technologies", ResearchGate, Jan. 2017 [uploaded on Feb. 2018], 17 pages [pp. 33-48], vol. 24, Nos. 1/2, Retrieved from the Internet: <URL: https://www.researchgate.net/publication/311101906_Deployment_of_vehicular_networks_in_highways_using_80211p_and_IPv6_technologies>.

* cited by examiner

GEOHASH-BASED TRAFFIC MANAGEMENT

BACKGROUND

The present application relates to computing, and more specifically, to methods, systems and computer program products for geohash-based traffic management.

With development of satellite navigation, e.g., Global Positioning System (GPS), automotive navigation system has been widely adopted in the automobile industry as well as other related industries. Automotive navigation systems are crucial for the development of self-driving vehicles. Typically, an automotive navigation system is part of the automobile controls or a third-party add-on used in an automobile with a satellite navigation device to get the position data of the automobile.

BRIEF SUMMARY

Additional aspects and/or advantages will be set forth in part in the description which follows and, in part, will be apparent from the description, or may be learned by practice of the invention.

In one illustrative embodiment of the present invention, there is provided a Geohash-based traffic management method. The method comprises receiving, by one or more processing units, respective operating status data of one or more vehicles travelling within a Geohash cell; generating, by one or more processing units, one or more service messages based on the received respective operating status data according to one or more service specifications; and providing, by one or more processing units, at least one of the one or more service messages responsive to a request from a vehicle travelling within the Geohash cell.

In one illustrative embodiment of the present invention, there is provided Geohash-based traffic management system, the system comprising a memory medium comprising program instructions, a processor, for executing the program instructions, when executing the program instructions causes the system to receive respective operating status data of one or more vehicles travelling within a Geohash cell, to generate one or more service messages based on the received respective operating status data according to one or more service specifications, and to provide at least one of the one or more service messages responsive to a request from a vehicle travelling within the Geohash cell.

Computer program products for improving the performance of a web-based application are also provided.

These and other features and advantages of the present invention will be described in, or will become apparent to those of ordinary skill in the art in view of, the following detailed description of the example embodiments of the present invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the invention can be deployed on cloud computer systems which will be described in the following. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
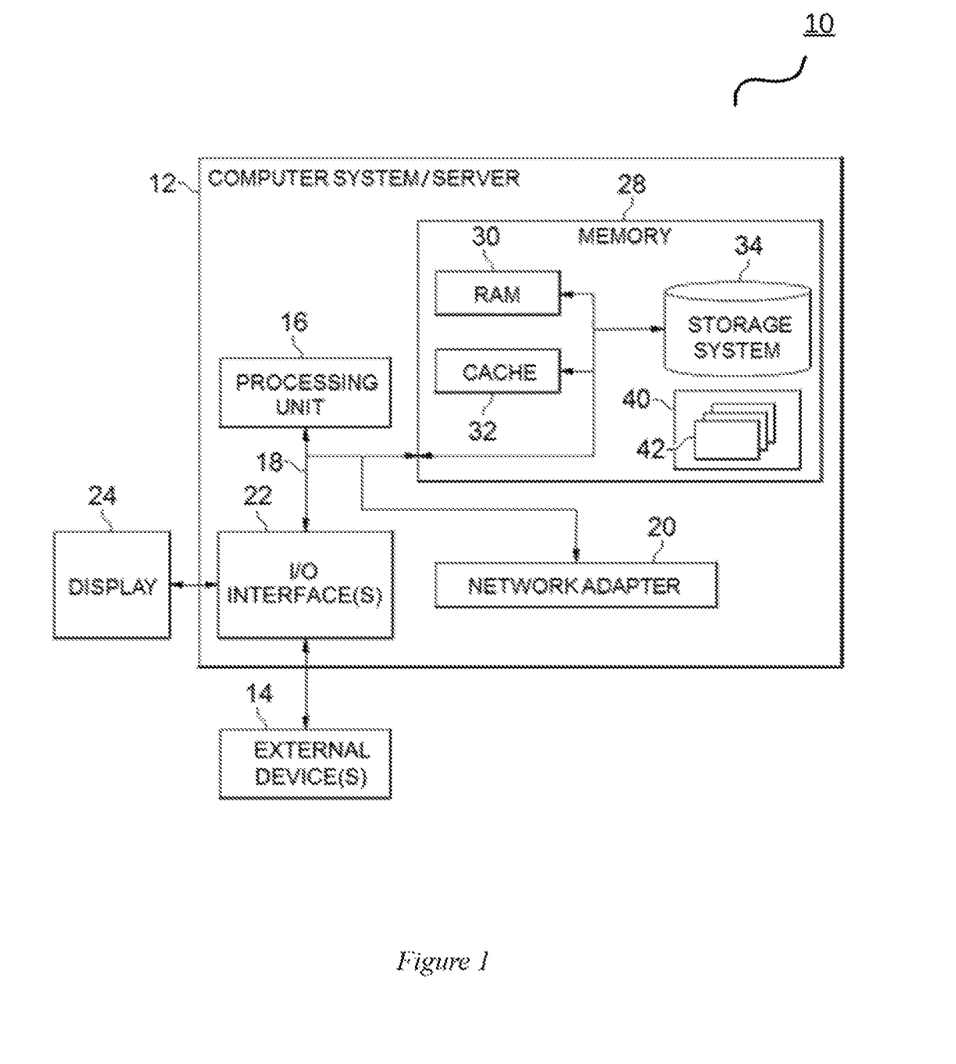
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
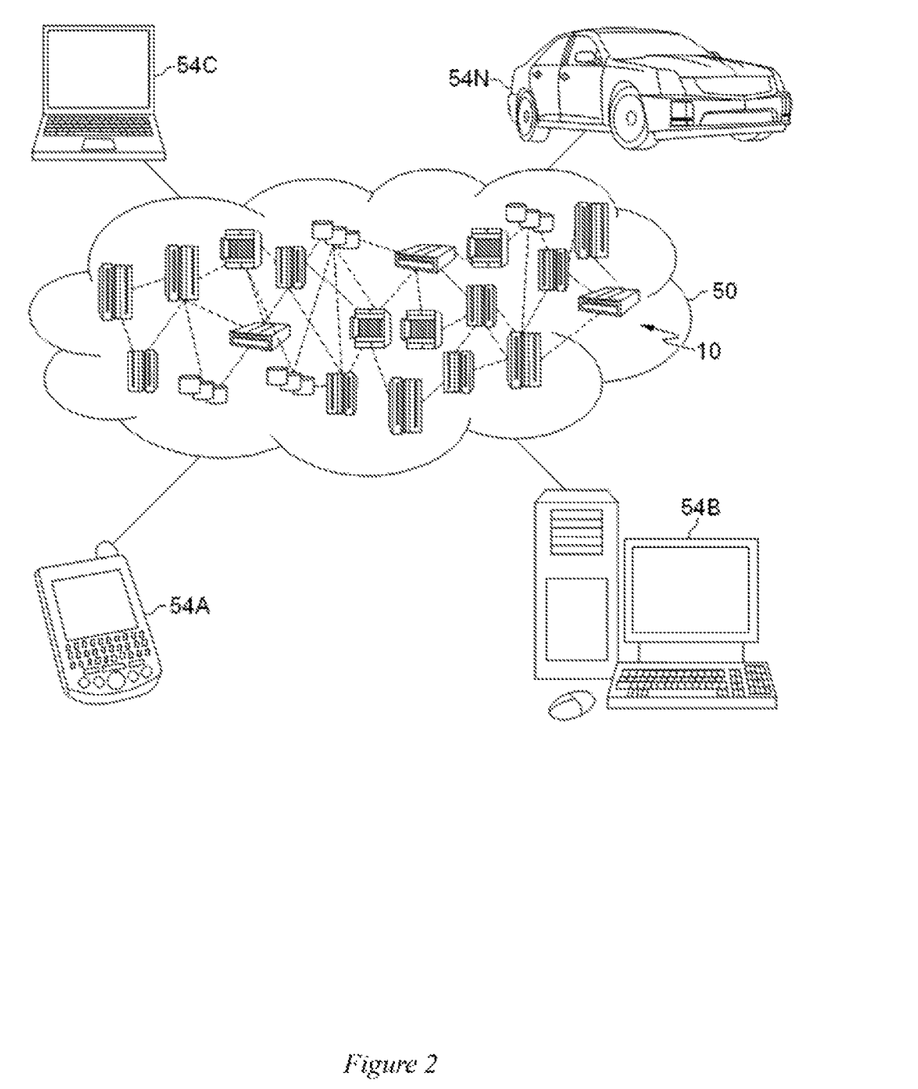
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
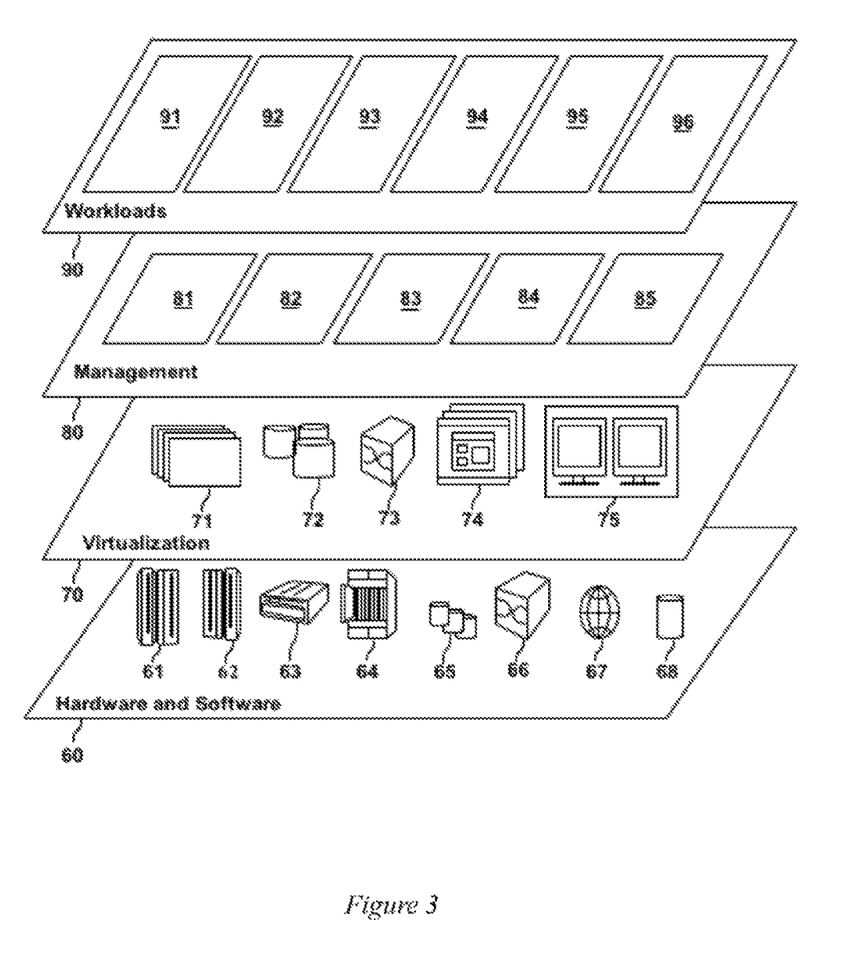
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and traffic management 96 according to embodiments of the invention.

As aforementioned, automotive navigation systems are crucial for the development of self-driving vehicles. It is crucial for a self-driving vehicle to be aware of its surrounding vehicle distribution in good weather conditions, bad weather conditions, low illumination, etc. However, navigation systems available nowadays fail to provide such capabilities. Embodiments of the invention are targeting to solve the problems in question with utilizing Geohash technologies.

Geohash is a public domain geocode system which encodes a geographic location into a short string of letters and digits. It is a hierarchical spatial data structure which subdivides space into buckets of grid shape, which is one of the many applications of what is known as a Z-order curve, and generally space-filling curves. Geohashes offer properties like arbitrary precision and the possibility of gradually removing characters from the end of the code to reduce its size (and gradually lose precision). As a consequence of the gradual precision degradation, nearby places will often (but not always) present similar prefixes. The longer a shared prefix is, the closer the two places are. To obtain the Geohash, an address to be geocoded, or latitude and longitude coordinates may be provided in a single input box on the page to generate corresponding Geohash. Besides showing the latitude and longitude corresponding to the given Geohash, an embedded map is also provided, and a GPX file may be downloaded, or the waypoint may be transferred directly to certain GPS receivers. For example, the coordinate pair (57.64911,10.40744) which is near to the tip of the peninsula of Jutland, Denmark produces a slightly shorter hash of u4pruydqqvj. With Geohash technologies, cells may be created for a certain region (e.g., a country, a province, or any geographic region), and from which those cells covering the traffic system to be managed may be picked. For a picked cell, Geohash of any address within it may be selected and used as cell identifier to uniquely identify the cell, however, the cell identifier may adopt any formats.

Figure 4:
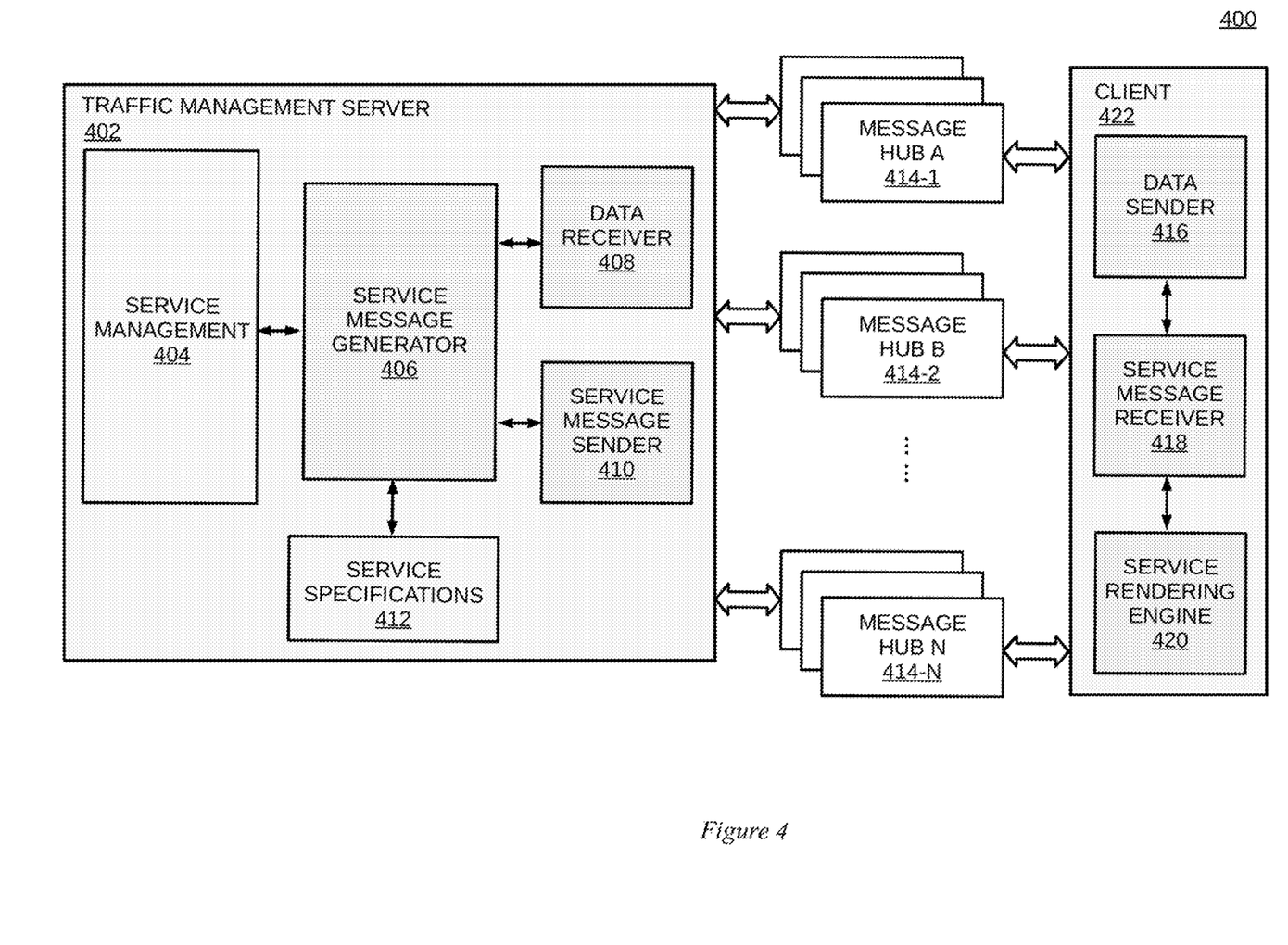
FIG. 4 depicts a block diagram of an exemplary system 400 in which embodiments of the invention may be implemented.

Referring now to FIG. 4, which depicts a block diagram of an exemplary system 400 in which embodiments of the invention may be implemented. System 400 provides Geohash-based traffic management according to embodiments of the invention. In the server side of system 400, the traffic management server 402 comprises service management 404, service message generator 406, data receiver 408, service message sender 410 and service specifications 412. According to an embodiment of the invention, message hubs 414-1, 414-2, . . . , 414-N which act as relays between the traffic management server 402 and one or more clients 422 (which reside inside respective vehicles) may be deployed to or associated with the cells. According to embodiments of the invention, depending on the load of different areas of the region, the size of cells may be different. For example, a large size cell may be created for an area with light load and a small size cell for an area with heavy load. Depending on the size of a cell and/or the load of a cell, one or more message hubs may be deployed to or associated with one cell, and/or one message hub may be responsible for the relay for a plurality of cells. For example, more message hubs may be deployed to or associated with a cell with heavy load and fewer for a cell with light load. For the purpose of easy management, message hub clusters each includes one or more message hubs may be constructed logically to form a hierarchical structure of message hubs. A message hub cluster includes one or more message hubs deployed to or associated with one or more cells which are responsible for the relay between the traffic management server 402 and one or more clients 422 travelling within the one or more cells. A client 422 (which resides inside a vehicle) comprises data sender 416, service message receiver 418 and service rendering engine 420. The traffic management server 402, the message hubs 414-1, 414-2, . . . 414-N (which may be organized into clusters), and the one or more clients 422 together form the Geohash based traffic management system 400. The function of each component will be described in detail in the following.

The data sender 416 of the client 422 is configured to send operating status data of the vehicle in which the client 422 resides to a message hub which is deployed to or associated with the cell within which the vehicle is traveling. Operating status data, according to embodiments of the invention, comprises any types of data that reflect the operating status of the vehicle, e.g., coordinates of the vehicle, a speed of the vehicle, the direction the vehicle is heading to, the lane information of the road the vehicle is travelling within, an acceleration of the vehicle, a rotational speed of the vehicle, a wind speed, a temperature, a pollutant concentration, etc. According to an embodiment of the invention, operating status data are sent by the data sender 416 periodically.

According to an embodiment of the invention, operating status data are associated with an identifier of the vehicle, and further associated with a timestamp when the operating status data are sent. The service message receiver 418 of the client 422 is configured to receive, from the traffic management server 402, one or more service messages via a message hub which is deployed to or associated with the cell within which the vehicle is traveling, and then pass the one or more service messages to the service rendering engine 420 for processing. The service rendering engine 420 is configured to process and render the received one or more service messages according to one or more service specifications (which conform with the one or more service specifications 412 in the traffic management server 402) that define the formats of service messages corresponding to one or more services provided by the traffic management 404. For example, the service rendering engine 420 may render a map showing vehicles currently in the same lane and neighboring lanes of the vehicle requesting the service based on the received one or more service messages.

According to embodiments of the invention, one or more services provided by the traffic management 404 include, for example, vehicle location information service, vehicle lane information service, vehicle speed information service, weather information service, etc. In Table 1 below, an example of a service message is shown for better understanding. The service message shown in Table is generated according to a service specification that conforms vehicle location information service provided by the traffic management based on received operating status data. In the service message, vehicle ID represents an unique identifier of a vehicle, timestamp represents the timestamp when the operating status message data of the vehicle was sent, location represents the location of the vehicle when the operating status message data of the vehicle was sent.

TABLE 1

| Vehicle ID | Timestamp | Location |
|---|---|---|
| 823579aac | 2020 Feb. 25 15:32:1 | (105.795261, 25.894413) |

Optionally, a cluster ID represents an unique identifier of a message hub cluster that received the operating status data (from a message hub), a message hub ID represents the an unique identifier of the message hub that received the operating status, and a cell ID represents an unique identifier of a cell within which the vehicle was traveling when the operating status data was sent may also be included in the service message. According to different configurations, cluster ID may or may not be presented in the service message. Cluster ID, message hub ID, and cell ID is not necessary as the related information can be easily retrieved based on the location of the vehicle from the traffic management 404 as the Geohash cells managed by the traffic management 404 were created and selected in advance, as mentioned in the above. Service messages may include different information according to different services provided by the traffic management, for example, detailed weather information.

The message hubs 414-1, 414-2, . . . , 414-N, deployed to or associated with corresponding cells and functioned as relays between the vehicle (with the client 422 residing in it) receive operating status data from the vehicle and relay to the traffic management server 402, and receive one or service messages from the traffic management server 402 and relay to the vehicle. According to an embodiment of the invention, message hubs may be organized into clusters thus form hierarchical structure for easy management. One cluster may comprise one or more message hubs with each message hub associated with one or more cells. Each message hub may be assigned with a message hub identifier to uniquely identify it. According to an embodiment of the invention, the cell identifier (or part of it) where the message hub is deployed in may be used as the message hub identifier. Each cluster may be assigned with a cluster identifier to uniquely identify it. According to an embodiment of the invention, any message hub identifier (or part of it) within the cluster may be selected and used as its cluster identifier. The traffic management 404 may use cluster identifier to locate a cluster, then use message hub identifier to locate a message hub within the cluster, and then a cell identifier to locate a cell associated with the message hub. In the case that no cluster is used, the traffic management server 402 may use message hub identifier to locate a message hub and a cell identifier to locate a cell associated with the message hub. Message hubs, traffic management server, and vehicles together creates a network functioning similar to a phone cellular network, in which vehicles function as mobile terminals, message hubs function as base stations serving the one or more cells to which it is deployed to or associated with.

The data receiver 408 of the traffic management server 402 is configured to receive respective operating status data of one or more vehicles traveling within respective cells from respective message hubs deployed to or associated with the respective cells and pass the operating status data to the service message generator 406. The service message generator 406 is configured to generate one or more service messages based on the received respective operating status data according to one or more service specifications 412. The service specifications 412 define the formats of service messages corresponding to one or more services provided by the traffic management 404. The service management 404 is configured to provide the one or more services. According to an embodiment of the invention, each of the one or more services provided by the traffic management 404 is associated with a service identifier to uniquely identify it. And the service message sender 410 is configured to send one or more service messages to a vehicle travelling within a cell via message hubs responsive to a request received from the vehicle. It should be pointed out that, although only one traffic management server 402 is shown in FIG. 4, a plurality of traffic management servers 402 may exist and coupled to respective message hubs (or clusters) and respective service management 404 together manage the plurality of traffic management servers.

In the following, embodiments of the invention will be described with reference to an exemplary signal flow according to an embodiment of the present invention depicted in FIG. 5. As aforementioned, the client 422 sends the operating status data of the vehicle it resides in, to this extent, 'client' and 'vehicle' are interchangeable in the disclosure.

Figure 5:
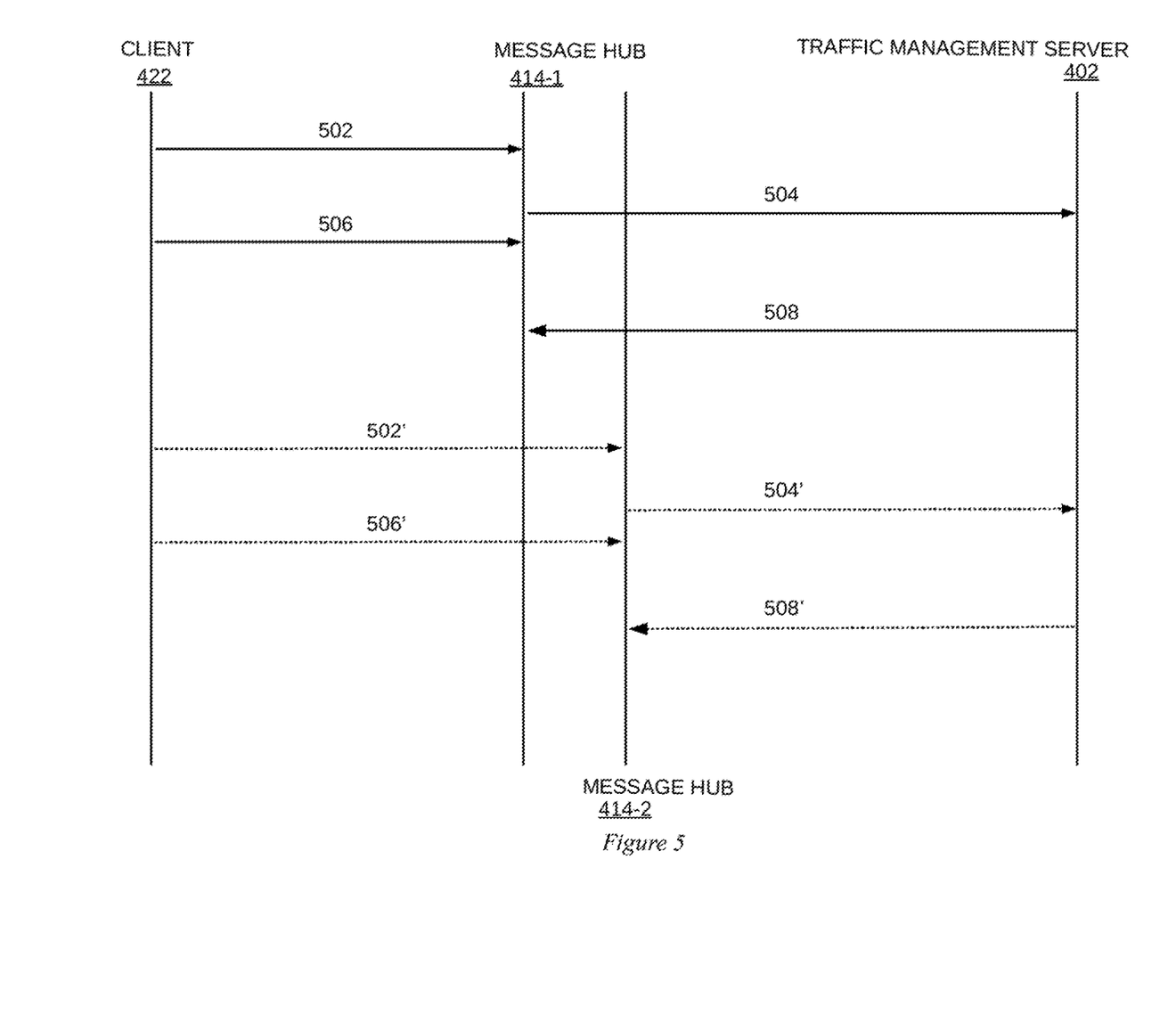
FIG. 5 depicts an exemplary signal flow according to an embodiment of the present invention.

In FIG. 5, the client 422 sends the operating status data of the vehicle in which it resides to a message hub 414-1 deployed to or associated with a cell within which the vehicle is traveling, shown as the reference number 502. The message hub 414-1 relays the operating status data to the traffic management server 402, shown as the reference number 504. Based on the received operating status data of the vehicle, one or more service messages are generated according to one or more service specifications. One or more further service messages may be generated based on other operating status data of other vehicles traveling within those cells with the same message hub 414-1 deployed to or associated with. Upon receiving a request by the message hub 414-1 from the client 422 (or any other client) traveling within those cells with the same message hub 414-1 deployed to or associated with, shown as the reference number 506, the message hub 414-1 relays the request to the traffic management server 402 (not shown). The traffic management server 402 provides one or more service messages via the message hub 414-1 to the client 422, shown as the reference number 508. It should be pointed out that as the vehicle is traveling, the message hub deployed to or associated with the cell within which the vehicle is current traveling may switch to a new message hub, the one or more service messages may be provided by the new message hub. However, in FIG. 5, it is shown with the same reference number 414-1 for the purpose of simplified illustration. Request sent by the client 422 is a request for a service the traffic management 404 provides and based on which the traffic management server 402 may provide one or more service messages generated according to the service specification that conforms the requested service.

If the client 422 travels to a different cell with a new message hub 414-2 deployed to or associated with, the client 422 will send the operating status data to the new message hub 414-2, shown as reference number 502'. The new message hub 414-2 relays the operating status data to the traffic management server 402, shown as the reference number 504'. Based on the received operating status data of the vehicle, one or more service messages are generated according to one or more service specifications. One or more further service messages may be generated based on other operating status data of other vehicles traveling within those cells with the same new message hub 414-2 deployed to or associated with. Upon receiving a request by the new message hub 414-2 from the client 422 (or any other client) traveling within those cells with the same message hub 414-2 deployed to or associated with, shown as the reference number 506', the new message hub 414-2 relays the request to the traffic management server 402 (not shown). The traffic management server 402 provides one or more service messages via the new message hub 414-2 to the client 422, shown as the reference number 508'. It should be pointed out that as the vehicle is traveling, the new message hub 414-2 deployed to or associated with the cell within which the vehicle is current traveling may switch to a new message hub, the one or more service messages may be provided by the new message hub. However, in FIG. 5, it is shown with the same reference number 414-2 for the purpose of simplified illustration. Request sent by the client 422 is a request for a service the traffic management 404 provides and based on which the traffic management server 402 may provide one or more service messages generated according to the service specification that conforms the requested service.

According to an embodiment of the invention, upon receiving a request from a vehicle via a message hub, the traffic management 404 is configured to retrieve from the request an identifier of the vehicle and a cell identifier of the cell within which the vehicle is traveling and provide one or more service messages to the vehicle based on the identifier of the vehicle and the cell identifier. According to an embodiment of the invention, the traffic management 404 is further configured to retrieve an identifier of a service from the request and further provide one or more service messages to the vehicle based on the service identifier.

According to an embodiment of the invention, if it is detected that a new operating status data associated with an identifier of a vehicle has been received, the traffic management 404 is further configured to determine that those operating status data associated with the same identifier that were previous received being expired and remove the expired operating status data. This ensures only the most updated operating status data of a vehicle is stored.

Figure 6:
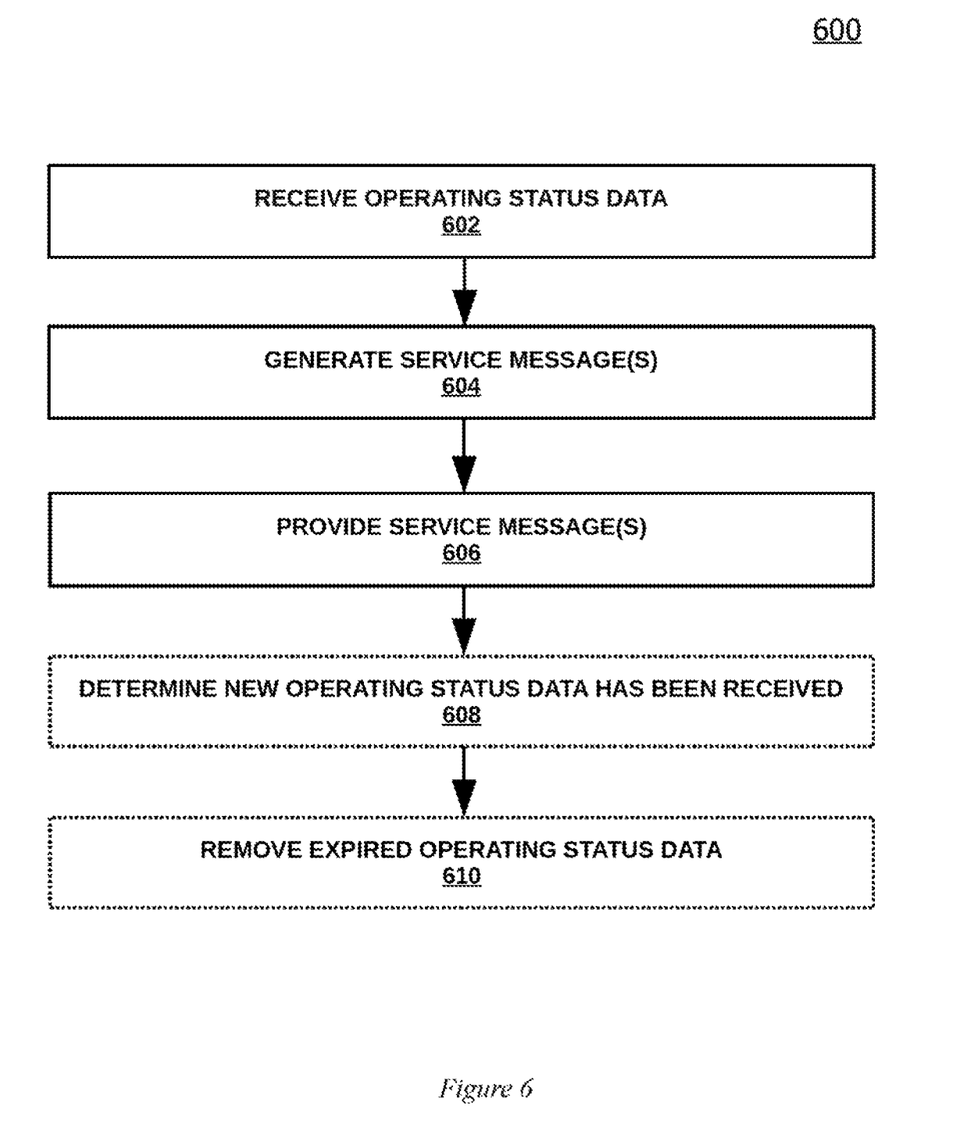
FIG. 6 depicts a flowchart of an exemplary method 600 according to an embodiment of the present invention.

Now referring to FIG. 6, which depicts a flowchart of an exemplary method 600 according to an embodiment of the present invention. The method 600 may be implemented for example in the traffic management server 402 of FIG. 4. At step 602, respective operating status data of one or more vehicles traveling within a Geohash cell is received, for example by the data receiver 408 in the traffic management server 402 of FIG. 4. Although here it is described as one or more vehicles traveling within a Geohash cell, it can also refer to one or more vehicles traveling within respective cells with the same message hub deployed to or associated with. Then at step 604, one or more service massages are generated based on the received respective operating status data, for example by the service message generator 406 in the traffic management server 402 of FIG. 4, according to one or more service specifications, for example, the service specifications 412 in the traffic management server 402 of FIG. 4. At step 606, at least one of the one or more service messages are provided responsive to a request from a vehicle traveling within a Geohash cell, for example via the service message sender 410 in the traffic management server 402 of FIG. 4.

According to an embodiment of the invention, at step 608, responsive to a detection that a new operating status data has been received for the same vehicle, those operating status data of the same vehicle that were previous received are determined as expired. And at step 610, the expired operating status data are removed.

According to an embodiment of the invention, the respective operating status data are received from the one or more vehicles travelling within its corresponding Geohash cell, periodically. According to an embodiment of the invention, the respective operating status data are associated with respective identifier of the one or more vehicles and are further associated with respective timestamp the respective operating status are sent. According to an embodiment of the invention, respective Geohash cells are associated with respective cell identifiers. According to an embodiment of the invention, the providing of the at least one of the one or more services messages further comprises retrieving an identifier of the vehicle from the request, determining a cell identifier of the Geohash cell the vehicle is travelling within, and provide the at least one of the one or more service messages to the vehicle based on the identifier of the vehicle and the cell identifier of the Geohash cell. According to an embodiment of the invention, wherein the one or more service specifications are corresponding to one or more services provided by the Geohash-based traffic management. According to an embodiment of the invention, the providing of the at least one of the one or more services messages further comprises retrieving an identifier of a service from the request and providing the at least one of the one or more service messages to the vehicle further based on the identifier of the service.

It should be noted that the traffic management according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A Geohash-based traffic management method, comprising:
    receiving, by one or more processing units, a respective operating status data of a plurality of vehicles travelling within a Geohash cell, wherein the Geohash cell is a specific geographical region, wherein a size of the specific geographical region is determined based on an amount of the traffic through the geographical region, wherein an amount of traffic determines a size of Geohash cell, wherein the received respective operating status data are associated with respective identifiers of the plurality of vehicles and are further associated with respective timestamps that the respective operating status data are sent;
    generating, by one or more processing units, one or more service messages based on the received respective operating status data associated with a first vehicle of the plurality of vehicles according to one or more service specifications;
    generating, by one or more processing units, one or more additional service messages based on the received respective operating status data associated with the plurality of vehicles according to one or more service specifications, wherein the additional service message is not based on an operating status of the first vehicle; and
    providing, by one or more processing units, at least one of the one or more service messages and the one or more additional service messages responsive to a request from the first vehicle travelling within the Geohash cell, wherein providing of the at least one of the one or more services messages further comprises:
        retrieving, by one or more processing units, an identifier of the first vehicle from the request
        determining, by one or more processing units, a cell identifier of the Geohash cell which the first vehicle is travelling within; and
        providing, by one or more processing units, the at least one of the one or more service messages to the first vehicle based on the identifier of the first vehicle and the cell identifier of the Geohash cell.

2. The method of claim 1, wherein the respective operating status data are received from the plurality of vehicles travelling within its corresponding Geohash cell, periodically.

3. The method of claim 1, wherein the one or more service specifications define formats of service messages corresponding to one or more services provided by the Geohash-based traffic management.

4. The method of claim 3, further comprising:
retrieving, by one or more processing units, an identifier of a service from the request; and
providing, by one or more processing units, the at least one of the one or more service messages to the vehicle further based on the identifier of the service.

5. The method of claim 1, further comprising:
responsive to a detection that a new operating status data associated with an identifier of a vehicle has been received, determining, by one or more processing units, those operating status data associated with the same identifier that were previous received as expired; and
removing, by one or more processing units, the expired operating status data.

6. A Geohash-based traffic management system, comprising:
a memory medium comprising program instructions;
a processor, for executing the program instructions, when executing the program instructions causes the system to:
receive respective operating status data of a plurality of vehicles travelling within a Geohash cell, wherein the Geohash cell is a specific geographical region, wherein a size of the specific geographical region is determined based on an amount of the traffic through the geographical region, wherein an amount of traffic determines the size a size of Geohash cell, wherein the respective operating status data are associated with respective identifiers of the plurality of vehicles and are further associated with respective timestamps that the respective operating status data are sent;
generate one or more service messages based on the received respective operating status data associated with a first vehicle of the plurality of vehicles according to one or more service specifications;
generate one or more additional service messages based on the received respective operating status data associated with the plurality of vehicles according to one or more service specifications, wherein the one or more additional service messages is not based on an operating status of the first vehicle; and
provide at least one of the one or more service messages and the one or more additional service messages responsive to a request from the first vehicle travelling within the Geohash cell, wherein providing of the at least one of the one or more services messages further comprises:
retrieve an identifier of the first vehicle from the request;
determine a cell identifier of the Geohash cell which the first vehicle is travelling within; and
provide the at least one of the one or more service messages to the first vehicle based on the identifier of the first vehicle and the cell identifier of the Geohash cell.

7. The system of claim 6, wherein the received respective operating status data are received from the plurality of vehicles travelling within its corresponding Geohash cell, periodically.

8. The system of claim 6, wherein the one or more service specifications define formats of service messages corresponding to one or more services provided by the Geohash-based traffic management.

9. The system of claim 8, when executing the program instructions, the processor further causes the system to:
retrieve an identifier of a service from the request; and
provide the at least one of the one or more service messages to the vehicle further based on the identifier of the service.

10. The system of claim 6, when executing the program instructions, the processor further causes the system to:
responsive to a detection that a new operating status data associated with an identifier of a vehicle has been received, determine those operating status data associated with the same identifier that were previous received as expired; and
remove the expired operating status data.

11. A computer program product for Geohash-based traffic management, comprising a non-transitory computer readable storage having program codes embodied therewith, the program codes comprising:
program codes to receive respective operating status data of one or more vehicles travelling within a Geohash cell, wherein the Geohash cell is a specific geographical region, wherein a size of the specific geographical region is determined based on an amount of the traffic through the geographical region, wherein an amount of traffic determines a size of Geohash cell, wherein the respective operating status data are associated with respective identifiers of the plurality of vehicles and are further associated with respective timestamps that the respective operating status data are sent;
program codes to generate one or more service messages based on the received respective operating status data associated with a first vehicle of the plurality of vehicles according to one or more service specifications;
program codes to generate one or more additional service messages based on the received respective operating status data associated with the plurality of vehicles according to one or more service specifications, wherein the one or more additional service messages is not based on an operating status of the first vehicle; and
program codes to provide at least one of the one or more service messages and the one or more additional service messages responsive to a request from the first vehicle travelling within the Geohash cell, wherein providing of the at least one of the one or more services messages further comprises:
program codes to retrieve an identifier of the first vehicle from the request program codes to determine a cell identifier of the Geohash cell which the first vehicle is travelling within; and
program codes to provide the at least one of the one or more service messages to the first vehicle based on the identifier of the first vehicle and the cell identifier of the Geohash cell.

12. The computer program product of claim 11, wherein the received respective operating status data are received from the plurality of vehicles travelling within its corresponding Geohash cell, periodically.

13. The computer program product of claim 11, wherein the one or more service specifications define formats of service messages corresponding to one or more services provided by the Geohash-based traffic management, and the program codes further comprising:
program codes to retrieve an identifier of a service from the request; and
program codes to provide the at least one of the one or more service messages to the vehicle further based on the identifier of the service.

14. The computer program product of claim 11, the program codes further comprising:

program codes to responsive to a detection that a new operating status data associated with an identifier of a vehicle has been received, determine those operating status data associated with the same identifier that were previous received as expired; and program codes to remove the expired operating status data.

\* \* \* \* \*